Patented Dec. 23, 1947

2,433,106

UNITED STATES PATENT OFFICE 2,433,106

2,4-DINITROPHENYL THIOCYANATE AS A FUNGICIDE

Albert L. Flenner and Russell A. Kaberg, Wilmington, Del., assignors to E. I. du Pont de Nemours & Company, Wilmington, Del., a corporation of Delaware No Drawing. Application April 16, 1942, Serial No. 439,238

3 Claims. (Cl. 167—30)

This invention relates to pest control and is particularly directed to methods and compositions for arresting eradicating infestations of microorganisms such as fungi, bacteria, mold and the like, in organic matter either in the natural or fabricated state, which compositions and methods are characterized in that the essential active agent is 2,4-dinitrophenyl thiocyanate.

Throughout the past decade an intensive search has been conducted in the pest control art for synthetic organic insecticides and fungicides which are sufficiently effective and at the same time cheap enough to displace the inorganic poisons now commonly used to combat insect and fungus infestations in the agricultural and industrial fields. The high cost of organic synthesis, however, has handicapped this search and makes it necessary, if a synthetic organic poison is to be competitive, for it to be either a specialty or to have outstandingly high toxicity.

Outside of a few organo metallic complexes such as the organic mercurials, very few synthetic organic compounds have been developed which possess a combination of the necessary factors of cheapness and high efficacy to make them suitable for practical application in the art. Among the most effective of such compounds are the various substituted phenols and phenolates. Outstanding among these are the dinitrophenols or cresols and the polychlorinated phenols such as pentachlorophenol. These materials, however, while highly effective are also highly toxic to the higher forms of life, being highly irritant to warm-blooded animals and causing severe injury to foliage. Other highly effective and related materials such as 2,4-dinitro-1-chlorobenzene have possessed similar and other undesirable properties to such an extent as never to have come into any practical use.

We have now found that infestations of fungi and like microorganisms may be controlled by treating the infected material or the material prior to infection with 2,4-dinitrophenyl thiocyanate. Our observations indicate that 2,4-dinitrophenyl thiocyanate is outstandingly toxic to these organisms, can be produced by cheap and effective synthesis and has a highly desirable combination of physical, chemical and biological properties all of which combine to provide a fungicide of outstanding merit.

We are aware that 2,4-dinitrophenyl thiocyanate has previously been tested as an insecticide with some, if mediocre, indications of toxicity and that a number of organic thiocyanates are known to have outstanding value for the control of certain forms of insect life. It does not appear, however, that thiocyanates have ever been recognized as having any value for the control of fungus or like microorganisms of the plant kingdom, and as far as known none of the organic thiocyanates which have obtained commercial significance in the art have ever been recommended for the control of such organisms. Moreover, our observations indicate that most organic thiocyanates, including those highly active insecticidally, are wholly inactive fungicidally.

2,4-dinitrophenyl thiocyanate can be synthesized simply and effectively from 2,4-dinitro-1-chlorobenzene, an intermediate in the manufacture of 2,4-dinitrophenol. The 2,4-dinitro-1-chlorobenzene is reacted with an alkali metal thiocyanate in a suitable solvent such as methanol or butanol. The reaction is nearly quantitative. The product consists of yellow crystals which may be easily comminuted to a fine, free-flowing, noncaking powder in combination with suitable conditioning agents. It is soluble in the usual organic solvents, such as alcohol, acetone, benzene and toluene. It is thus easily compounded into fungicidal compositions either as a dust, as a water-dispersible powder or as a solution. The following examples are illustrative. The parts are by weight.

Example 1

One part of 2,4-dinitrophenyl thiocyanate is milled with 99 parts of talc to provide a composition suitable for a dusting material to prevent or eradicate infestations of fungi and like microorganisms.

In place of the talc there may be substituted other dusting powders such as diatomaceous earth, Bancroft clay, pyrophyllite, walnut shell flour and Tolanite, and the proportions may be varied to give from 1 to 50% 2,4-dinitrophenyl thiocyanate.

Example 2

Eighty parts of 2,4-dinitrophenyl thiocyanate is milled with 14 parts tricalcium phosphate, 5 parts bentonite and 1 part technical n-dodecyl alcohol to give a water-dispersible product for preparing aqueous spray suspensions.

In place of the tricalcium phosphate and the bentonite there may be substituted other conditioning agents to improve dispersibility and load-building properties such as diatomaceous earth, pyrophyllite, Tolanite, Bancroft clay, walnut shell flour and soyabean flour, and in place of the technical dodecyl alcohol there may be substituted other surface active materials capable of imparting wetting out properties such as sodium oleate, sodium lauryl sulfate, long chain quaternary ammonium halides, sulfonated fish, vegetable and mineral oils.

Example 3

Five parts of 2,4-dinitrophenyl thiocyanate is dissolved in 100 parts of benzene and the resulting solution blended into 896 parts of mineral spirits to provide a solution suitable for treating or impregnating material to control fungus infestation.

In place of the mineral spirits there may be substituted other mineral oil fractions such as kerosene or fuel oil, and in place of the benzene there may be substituted other aromatic hydrocarbon solvents such as toluene. Oxygenated solvents such as acetone and dioxane may be used. Also, other materials which act to blend the 2,4-dinitrophenyl thiocyanate in the mineral oil may be used to provide solutions containing 2,4-dinitrophenyl thiocyanate in excess of its normal solubility in the mineral oil.

The effectiveness of 2,4-dinitrophenyl thiocyanate against some important destructive fungi is illustrated in the following table. In obtaining these data the compound is dispersed in hot metal agar which is allowed to solidify in petri dishes and sprayed with a suspension of the spores of the indicated fungi.

*Table*

| Compound | Concentration Effective In Preventing All Growth Of— | |
|---|---|---|
| | Lumber Mold | Aspergillus niger |
| 2,4-Dinitrophenyl thiocyanate | 1-80,000 | 1-80,000 |
| Sodium pentachlorophenolate | 1-25,000 | 1-25,000 |
| Bornyl thiocyanate | Less than 1-250 | Less than 1-250 |
| 4,4'-Dithiocyano-diphenylamine | Less than 1-250 | Less than 1-250 |
| Beta-phenoxyethyl thiocyanate | Less than 1-250 | Less than 1-250 |
| Pinene dithiocyanate | Less than 1-500 | Less than 1-500 |
| Butadiene thiocyanate | Less than 1-500 | Less than 1-500 |
| Cyclohexylamine thiocyanate | Less than 1-500 | Less than 1-500 |
| Piperidine thiocyanate | Less than 1-500 | Less than 1-500 |
| Diphenyl guanidine benzyl thiocyanate | | Less than 1-500 |

The data given in the above table illustrate the marked superiority of 2,4-dinitrophenyl thiocyanate as compared with such highly effective material as sodium pentachlorophenolate. It also shows that fungicidal activity is not an expected property of organic thiocyanate.

The compositions of our invention are of value in controlling infestations of plants and may be applied to most varieties of plants with safety. They may be used for surface treating and impregnating lumber and millwork, for incorporation in felted products such as wallboard and paper, for inclusion in paint, for the treatment of rope, leather, hides, for seed disinfecting and for such other applications as water-insoluble fungicides are suitable.

The term "fungicide" is used herein and in the appended claims in the sense that it is used in the Insecticide Act of 1910 and the Regulations for Enforcement (3rd Revision, August 28, 1928, U. S. Dept. Agriculture Food and Drug Adminis. S. R. A. I. F., No. 1, October 1928).

The product of our invention may be used in various combinations with such auxiliary materials as spreaders, stickers, and other toxicants; for example, insecticides such as metallic arsenates, fluosilicates, phenothiazines, organic thiocyanates such as n-dodecyl thiocyanate and butyl Carbitol thiocyanate, nicotine, anabasine (neonicotine), nor-nicotine, rotenone and its congeners, hellebore, pyrethrum, N-isobutylundecylenamide, aminomethyl sulfides, and bactericides and fungicides such as sulfur, polysulfides such as lime-sulfur, the chlorinated phenols, aminomethyl sulfides, copper acyl-acetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quaternary ammonium halides and derivatives of dithiocarbamic acid such as ferric dimethyldithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, pyrophyllite, talc, bentonite, flours such as walnut shell, wheat, redwood, soyabean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures as are here set out may have particular usefulness in special applications and frequently will give better results than would be anticipated from the killing power or repellent action of each ingredient when used alone.

We claim:

1. A fungicidal composition comprising a mineral oil solution of 2,4-dinitrophenyl thiocyanate containing a minor amount of an aromatic hydrocarbon solvent, said 2,4-dinitrophenyl thiocyanate being present in said solution in excess of its normal solubility in said mineral oil and said aromatic hydrocarbon solvent stabilizing said solution to prevent separation of 2,4-dinitrophenyl thiocyanate.

2. A fungicidal composition comprising a mineral oil solution of 2,4-dinitrophenyl thiocyanate containing 2,4-dinitrophenyl thiocyanate in solution in excess of its solubility in said mineral oil said solution being stabilized by a blending solvent.

3. The composition of claim 1 in which the aromatic hydrocarbon solvent is benzene.

ALBERT L. FLENNER.
RUSSELL A. KABERG.

REFERENCES CITED

The following references are of record in the file of this patent:

UNITED STATES PATENTS

| Number | Name | Date |
|---|---|---|
| 1,950,315 | Lockemann et al. | Mar. 6, 1934 |
| 1,993,040 | Salzberg | Mar. 5, 1935 |
| 2,024,098 | Heckert | Dec. 10, 1935 |
| 2,124,400 | Heckert | July 19, 1938 |
| 2,135,987 | Murphy | Nov. 8, 1938 |

OTHER REFERENCES

Wilcoxon et al., Chem. Abs., v. 29, 1935, page 8210.